United States Patent [19]

Webster et al.

[11] 4,034,216

[45] July 5, 1977

[54] LIGHTING FIXTURE

[75] Inventors: Robert B. Webster, Huntington Beach; Charles Gretz, Calabasas, both of Calif.

[73] Assignee: Robert B. Webster, Huntington Beach, Calif.

[22] Filed: June 19, 1975

[21] Appl. No.: 588,369

[52] U.S. Cl. .......................... 240/78 F; 240/73 BA; 174/61

[51] Int. Cl.² .......................... F21S 1/06; H02B 1/10

[58] Field of Search .......... 240/73 R, 73 BA, 78 R, 240/78 F; 174/61; 211/26

[56] References Cited

UNITED STATES PATENTS

| | | | |
|---|---|---|---|
| 1,407,527 | 2/1922 | Goldich | 240/78 F X |
| 1,625,626 | 4/1927 | Riddle | 240/78 F |
| 1,658,206 | 2/1928 | Matthyssen | 240/78 F |
| 1,743,567 | 1/1930 | Perry | 240/73 BA X |
| 3,621,113 | 11/1971 | Westby | 174/61 X |
| 3,745,330 | 7/1973 | Frost | 240/73 BA X |

*Primary Examiner*—George H. Miller, Jr.
*Attorney, Agent, or Firm*—Gardner and Anten

[57] ABSTRACT

A lighting fixture in the form of a chandelier having chandelier arms. There is a central body having an upstanding fixture part, and to which the chandelier arms are secured. The arms are unique in that they consist of metal tubes of ornamental shape for carrying the wiring and carrying ornamental designs of plastic molded onto the tubes. Within the central body is a metal box to which the tubes of the arms connect and to which also connect vertical tubes for wiring to provide safety. The central body is of molded construction with the metal box within it.

6 Claims, 3 Drawing Figures

LIGHTING FIXTURE

BACKGROUND OF THE INVENTION

1. Field of the Invention

The field of the invention is that of lighting fixtures and more particularly chandelier constructions having chandelier arms. The invention resides in the particular construction of the chandelier assembly and the arms and the method of fabricating and assembly.

2. Description of the Prior Art

Chandeliers having ornamental construction are known in the art. Typically in the prior art, a central chandelier body is provided with chandelier arms assembled and secured to the body in some way. It is known to provide chandelier arms configurated to have an ornamental design. It has been known to construct the arms as molded mating halves with the wiring assembled between the halves. Known prior art patents include the following: U.S. Pat. Nos. 3,300,635; 3,354,305; 3,735,123; 3,745,330; 3,831,022; 3,387,129; 3,622,779 and Belgian Pat. No. 572,602.

SUMMARY OF THE INVENTION

The preferred exemplary form of the invention as described in detail herein, comprises a central molded chandelier body of ornamental design. Assembled within it and secured to the body are ornamental chandelier arms. The arms are formed by ornamentally shaped tubes having ornamental design configurations molded onto the tubes. At the ends of the arms are bobeches, carrying simulated candler holders.

The central ornamental decorative body contains a metal box. The chandelier arms are assembled and secured to the box. The inner ends of the tubes of the chandelier arms connect to the box. Additional vertical tubes for containing wiring connect to the metal box.

In the light of the foregoing, a primary object of the invention is to provide an improved simplified construction of ornamental chandeliers and particularly having arms that are constructed of ornamentally shaped metal tubes having ornamental decorative design configurations molded thereon.

Another object is to provide chandelier construction, including a central molded decorative body having in it a metal wiring box which the ends of wire containing tubes are secured.

Further objects and additional advantages of the invention will become apparent from the following description and annexed drawings.

DESCRIPTION OF THE PREFERRED EMBODIMENT

Figure 1:
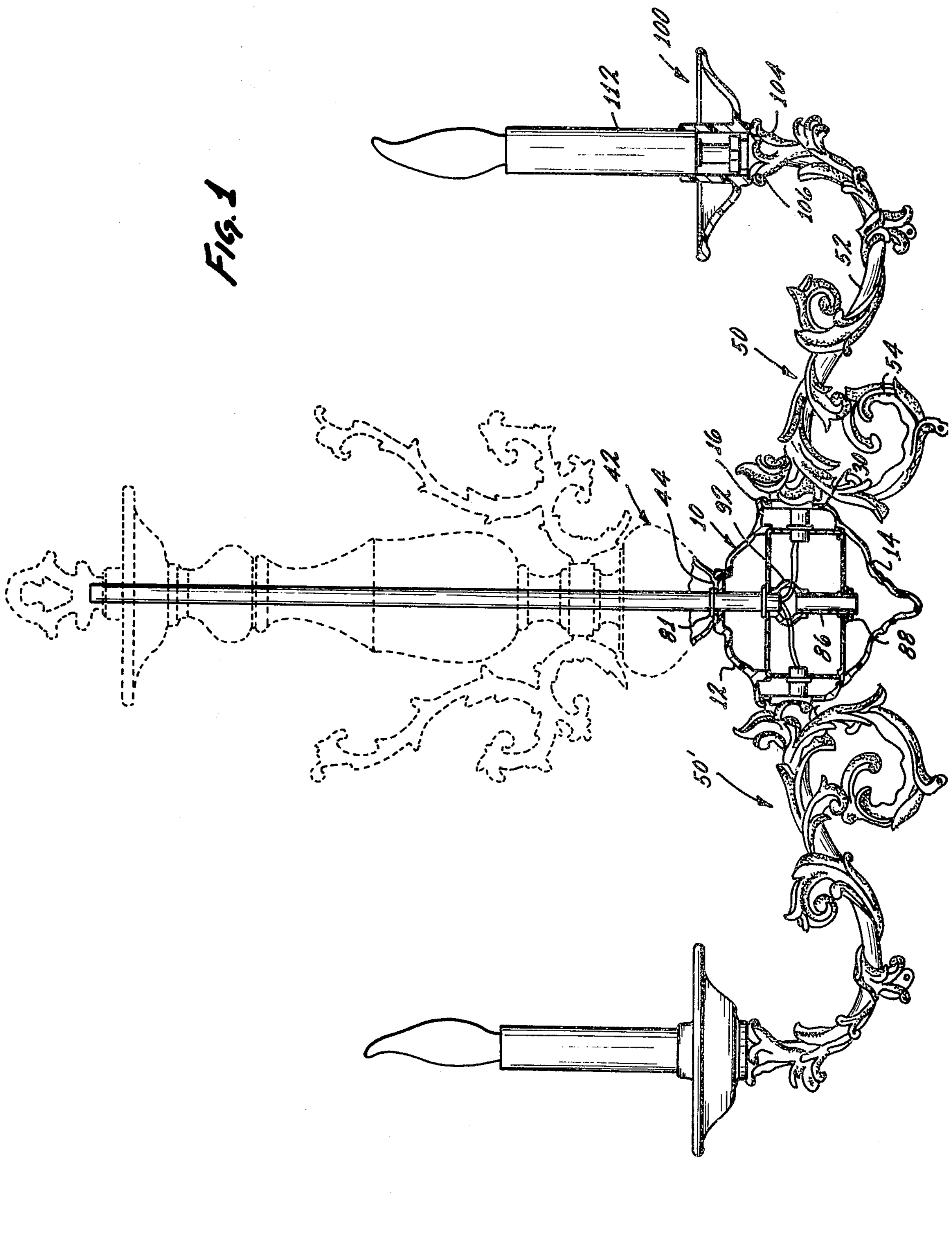
FIG. 1 is a view partly in section of a preferred form of the invention.

Referring to the drawings, FIG. 1 shows a preferred form of the chandelier of the invention. It comprises a central molded and decorative body 10, which may be molded of various materials, such as for example different kinds of plastic. The configuration of body 10 is shown more in detail in FIG. 2. The body 10 is formed in two parts including an upper part 12 and a lower part 14. The two parts fit together with a snap fit to form an enclosure as shown. The upper part has a peripheral rim 16 providing an annular groove 18 on the inside of it. Spaced inwardly from the periphery there is a downwardly extending annular rib 22 having an arcuate annular groove 24 in it, as will be referred to again presently. At the top of the upper part 12, there is a circular rib 26, the top part inside of the rib, as shown at 28 being flat.

Figures 2, 3:
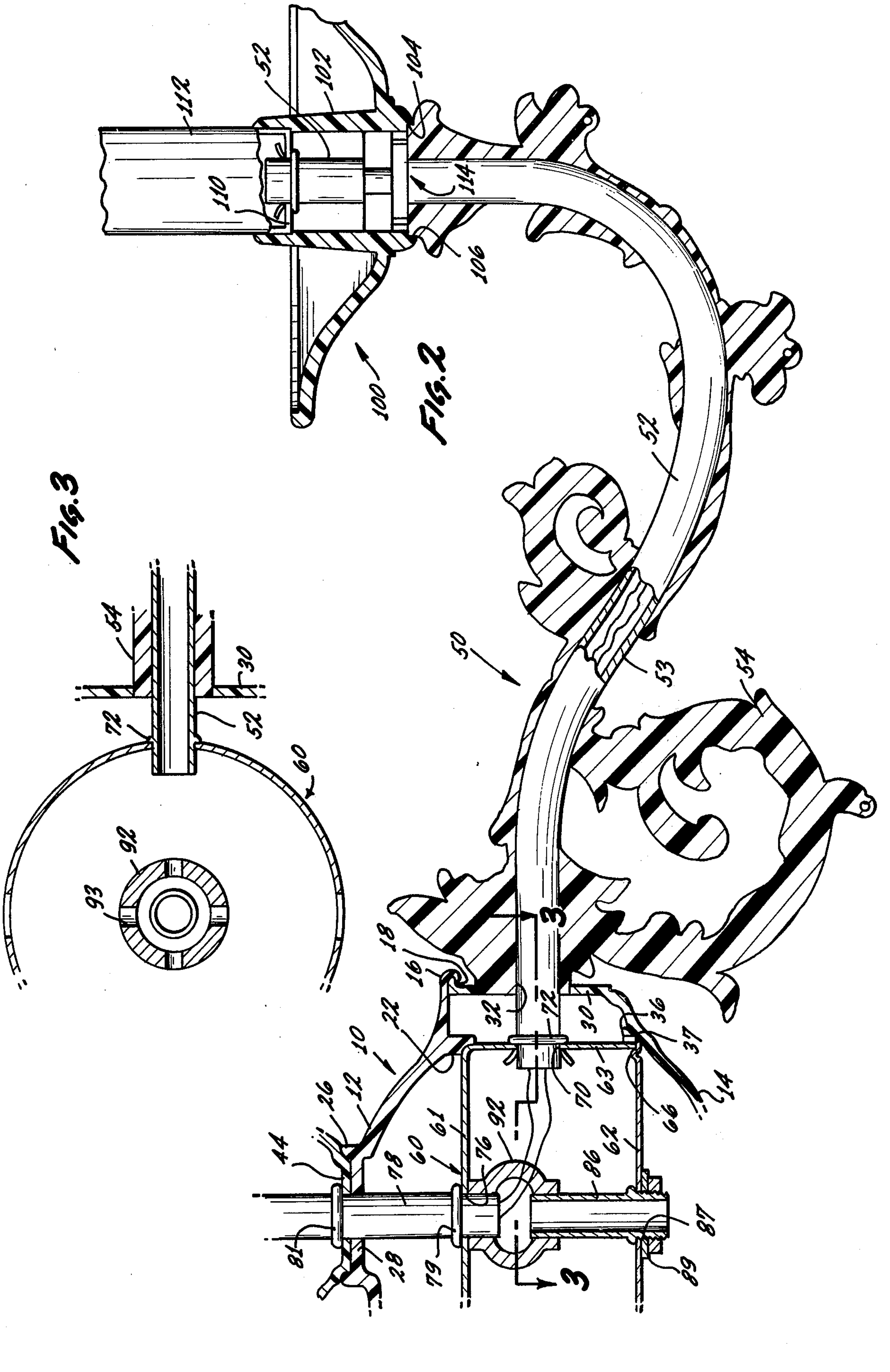
FIG. 2 is an enlarged sectional view of one of the chandelier arms and a part of the central body.
FIG. 3 is a sectional view taken along the line 3-3 of FIG. 2.

The lower part 14 of the enclosure has a side as designated at 30 in FIG. 2, this side part having an opening 32 including a slot to receive the chandelier arm, as will be described presently. On the inside of the lower section or portion 14 is an annular rib 36, providing a square shoulder 37 which will be referred to again presently. The construction at the other side of the enclosure 10 is the same, and therefore need not be described in detail.

Referring again to FIG. 1, supported above the enclosure 10 is an upright ornamental chandelier construction designated generally by the numeral 42. At the lower part of the upright portion, there is a circular boss 44 of a size configurated to fit into the rib 26 on the upper part 12 of the enclosure or body 10.

Assembled with the central body 10 are chandelier arms, as designated at 50 and 50', these constructions being alike. The chandelier arm 50 is shown in cross-section in FIG. 2. It comprises a metal tube 52 of ornamental shape as shown for containing wiring 53. The chandelier arm provides an ornamental design. The design is provided by way of an ornamental configuration as designated at 54, which is of molded construction being molded as for example from plastic, being molded directly on to the metal tube 52. In this way a construction of highly pleasing appearance can be realized in a simple and economic way while at the same time realizing a construction which meets safety requirements in that the wiring is enclosed within the metal tube 52.

The chandelier arm 50 is assembled with and secured to the central body 10.

Within the central body 10, there is provided a wiring containing box 60, having a top 61, a bottom 62 and a side 63, the box being cylindrical. The upper corner of the box 61 is rounded and fits into the annular groove 24 in the rib 22. The bottom 62 of the box has a rib 66 as shown which fits against the side 63, the edge of the bottom 62 fitting into the shoulder 37, as previously described.

The side 63 has an opening 70 in it which receives the end of the tube 52, which has on it the rib 72, that fits against the side 63. The side 30 of the bottom section 14 has an opening in it, previously described, to receive the tube 52 and the inner end of the ornamental design 54.

In the top 61 of the box 60 is an opening 76 that receives a wire containing tube 78 that extends vertically through the upper wall 28 and the lower wall 44 of the upright section 42. Tube 78 has ribs 79 and 80.

Numeral 86 designates another wire containing tube which extends through opening 87 in the bottom wall 62 of the box. It is threaded having on it a nut 88 and washer 89.

Numeral 92 designates a hickey connected between the lower end of tube 78 and the upper end of tube 86, for receiving wires that extend up through tube 78 to the light at the end of the upright fixture portion. See FIG. 3. The hickey has said openings 93.

At the outer end of the chandelier arm 50 is a bobeche 100 having a cross-sectional shape as shown and which may conform to constructions as known in the prior art. It is constructed to simulate a candle holder. It has a central cylindrical part 102. At the end of the design configuration 54 of arm 52 there is a circular boss 104 and at the lower end of the cylindrical part 102 there is formed an annular recess or shoulder 106 of a size to fit over the boss 104 as shown. The ends of the tube 52 extends up into the cylindrical part 102. At its upper end, it supports a bracket 110 for a light bulb which is positioned within a tube 112 fitted into the upper end of the cylindrical part 102, to resemble or simulate a candle holder. The bobeche may be assembled to the end of the chandelier arm by way of a bayonette slot type connection as generally designated at 114, this being a type of construction known in the prior art.

From the foregoing, those skilled in the art, will readily understand and appreciate the nature of the construction of the invention. The construction is fully capable of meeting all safety requirements, particularly in that the wiring both in the chandelier arms and the central body is enclosed and protected by metal tubing. The desired ornamental and decorative design configurations are realized effectively and economically by way of molding the design configurations on to the metal tubes. The parts can readily and securely be assembled in the manner shown with the metal box within the central molded construction with the chandelier arms secured thereto.

The foregoing disclosure is representative of a preferred form of the invention and is to be interpreted in an illustrative rather than a limiting sense, the invention to be accorded the full scope of the claims appended hereto.

We claim:

1. An ornamental chandelier construction, comprising:

central box member adapted to contain electrical wiring; said central box member having openings therein for permitting electrical wiring to pass therethrough;

central, ornamental structure connected to and enclosing said central box member so as to cover said central box member and present an ornamental appearance; and plurality of chandelier arms connected to said central box member and said central, ornamental structure;

each of said chandelier arms including an inner tubular member adapted to contain electrical wiring, and an ornamental design configuration molded on said tube;

the interior of said tube of each of said chandelier arms communicating with the interior of said central box member via one of said openings in said central box member.

2. An ornamental chandelier construction according to claim 1, wherein said central box member is of metal construction.

3. An ornamental chandelier construction according to claim 1, wherein said tubular members in said chandelier arms are of metal construction.

4. An ornamental chandelier construction according to claim 1, wherein said central, ornamental structure is made of plastic material.

5. An ornamental chandelier construction according to claim 1, wherein said ornamental design configurations molded on said tubular members of said chandelier arms of plastic construction.

6. An ornamental chandelier construction according to claim 1, wherein said central box member and said tubular members in said chandelier arms are of metal construction, and said central, ornamental structure and said ornamental design configurations molded on said tubular members of said chandelier arms are of plastic construction.

* * * * *